3,576,703
STRETCHABLE FABRIC-PLASTIC FILM LAMINATES

Melvin C. Baker and Boni Philip Martinez, Wilmington, Del., assignors to E. I. du Pont de Nemours and Company, Wilmington, Del.
No Drawing. Filed Apr. 22, 1968, Ser. No. 723,281
Int. Cl. B32b 5/04, 27/12
U.S. Cl. 161—77                               11 Claims

ABSTRACT OF THE DISCLOSURE

Laminates, suitable for use in vacuum forming applications, comprising a stretchable thermoplastic fabric, e.g., nylon or polyester knit fabrics, and a plastic film, e.g., polyvinyl chloride, are disclosed. The laminates are prepared using vinyl acetate/ethylene copolymer adhesive compositions which are ordinarily applied to the plastic film in emulsion form.

BACKGROUND OF THE INVENTION

Increasing use is being made of plastic films adhesively secured to fabrics, i.e., fabric-film laminates, as a substitute for leather in the upholstery field. Since the laminates are ordinarily applied to shaped surfaces such as seats and the backs of chairs, the primary requirements are that they have sufficient stretch to fit well over the curved contours encountered in the upholstery field, and that they can be readily tailored by the conventional cut and sew methods.

However, with the advent of more complex contoured shapes, particularly in the automotive upholstery field, it becomes very difficult as well as expensive to achieve proper tailoring by conventional cut and sew methods. One approach to overcome this problem is to shape the laminate by a post forming operation into the desired configuration. A method of doing this is vacuum forming which consists of permanently shaping a heated laminate over a mold which utilizes vacuum suction as the forming force.

While, initially the vacuum forming technique presented a significant problem since customary fabric-film laminates would not satisfactorily conform to the mold or retain their molded shape for an appreciable period of time after molding, these problems were by-and-large overcome through the use of stretchable fabrics in combination with the plastic films. Such fabrics are shown in U.S. Pats. 2,706,699; 3,127,306; and 3,207,654. While the use of a stretchable fabric obviated some problems associated with the technique of vacuum forming, a significant problem still remained.

For many applications the area increase of the laminate on vacuum forming is in excess of 200 percent; particularly where 90° turns or even small radius U turns are part of the molded configuration. Quite obviously, enormous stress is put on the plastic film during such stretching, which stress remains after the formed article is cooled. Accordingly, when tears develop in the film, they propagate quite rapidly. While the stretchable fabric serves to retard the propagation of such tears, it does not so function where it is not securely adhered to the plastic film. Accordingly, the adhesive composition used to secure the fabric to the film must have sufficient adhesive properties to provide a firm bond even after extensive stretching of the laminate. However, it has been found that this is not the only criteria which an adhesive must possess to be suitable for vacuum formable laminates. Even though the fabric is securely laminated to the film, as demonstrated by high peel strengths, it has been noted that tears in the film still tend to propagate unduly with customary adhesives. Accordingly, while the peel strengths of the structure appear to be satisfatcory, the tear strength is deficient. Consequently, there is presently a great need for an adhesive which, when used to laminate a stretchable fabric and a plastic film, yields a structure with both good peel strength and good tear strength.

SUMMARY OF THE INVENTION

In acordance with the present invention there is provided a thermoformable fabric-plastic film laminate which not only has good adhesive strength but additionally has high tear strength. The present thermoformable laminate comprises a stretchable fabric bonded to a plastic film with an adhesive which essentially comprises a vinyl acetate/ethylene copolymer containing about 5–40 weight percent copolymerized ethylene. Most conveniently, the present laminate is prepared by applying to the film an aqueous dispersion of the copolymer followed by application of the fabric and lamination under heat and pressure. Further, where high water resistance of the laminated structure is desired, a crosslinked copolymer can be used.

DESCRIPTION OF THE PREFERRED EMBODIMENTS

Vinyl acetate/ethylene copolymers have been discovered to be especially useful in preparing vacuum formable plastic film-fabric laminates. Such copolymers contain about 5–40 weight percent copolymerized ethylene. Copolymers containing less than about 5 percent ethylene are too stiff and brittle for use herein; the resulting laminated structure exhibiting deficient tear strength. Copolymers containing greater than about 40 weight percent ethylene are too soft to function effectively as the adhesive. Desirably, copolymers having less than about 25 weight percent ethylene, and preferably 10–20 percent ethylene, are employed. The molecular weight of useful vinyl acetate/ethylene copolymers is not particularly critical so long as the copolymer has sufficient cohesive strength. Accordingly, very low molecular weight copolymers are avoided. In general, copolymers having molecular weights corresponding to inherent viscosities (measured as 0.5% by weight of solids in a solution of 1% aqueous acetone at 25° C.) of 0.6–2.0 are useful while copolymers with inherent viscosity 0.8–1.5 are preferred.

The particular manner in which the vinyl acetate/ethylene copolymer is prepared is not critical though ordinarily aqueous emulsion polymerization techniques are used. When such is the case, the emulsion containing the dispersed polymer can be directly applied to the plastic film after which the fabric is applied and the structure laminated under heat and pressure. When the copolymer is applied to the film as an aqueous emulsion, it is generally necessary that the emulsion contain at least about 0.05 weight percent of surfactant, based on the weight of the copolymer. While a sufficient amount of surfactant is ordinarily present during emulsion polymerization in the aqueous medium, it can also be added to the emulsion prior to its application to the vinyl film. In the absence of surfactant, e.g., when the emulsion polymerization is accomplished with a protective colloid (polyvinyl alcohol) and no surfactant is thereafter added, it has been found that the emulsion does not sufficiently wet the vinyl film to ensure a good bond on lamination between the stretchable fabric and the plastic film. The upper limit on the amount of surfactant is not especially critical though, in order to avoid laminate water sensitivity, amounts in excess of about 6–8 weight percent are ordinarily not used.

The particular nature of the surfactant, i.e., anionic, non-ionic, cationic, or compatible mixtures thereof, is not particularly critical. Suitable surfactants and aqueous polymerization techniques for forming vinyl acetate/ethylene copolymer emulsions are described in the following patents: U.S. Pat. 3,355,322 issued Nov. 28, 1967 to Worrall et al.; U.S. Pat. 3,337,482 issued Aug. 22, 1967, to Watanabe et al.; German Pat. 1,127,085 issued Apr. 5, 1962; French Pat. 1,226,382 issued Feb. 22, 1960; and Netherlands application 66,04289. Particularly preferred surfactants are those sold under the following tradenames: "Aerosol" OT (sodium dioctyl sulfosuccinate anionic surfactant sold by American Cyanamid); "Aerosol" MA (sodium dihexyl sulfosuccinate anionic surfactant sold by American Cyanamid); "Triton" X-100 (octylphenyl polyether alcohol [9-10 TO units] nonionic surfactant sold by Rohm & Haas); "Ultrawet" K-40 (sodium dodecylbenzenesulfonate [linear] anionic surfactant sold by Atlantic Richfield); "Atlas" G-271 (N-soya-N-ethyl morpholinium ethosulfate, 35% aqueous solution, cationic surfactant sold by Atlas); and "Armeen" DMCD (tertiary fatty amines [n-alkyl dimethyl amines] cationic surfactant sold by Armour).

The vinyl acetate/ethylene copolymer can be applied to the film by any convenient manner. Roller coating is usually most suitable when the copolymer is in an emulsion form. In general, at least about 0.20 ounce of adhesive (dry) per square yard of film is necessary to achieve adequate adhesion. When using adhesive emulsions, if more than about 2 ounces of adhesive are applied, excessive drying times are required. About 0.25 to 0.5 ounce of adhesive (dry) per square yard of film is felt to be about optimum. Also, when the adhesive is applied in emulsion form, it has been found desirable to include a thickener in an amount sufficient to give an emulsion viscosity (Brookfield at 60 r.p.m.) of about 1,000 to 20,000 centipoises. Emulsions with these viscosities can conveniently be applied to the film in the desired thicknesses. Any of the well known emulsion thickeners, such as the methyl or hydroxyethyl substituted celluloses, added in amounts of about 0.05 to 1 weight percent, based on the weight of the emulsion, can be used in the present invention.

While, as discussed above, non-crosslinkable vinyl acetate/ethylene copolymers are useful in the present invention, frequently it is desirable, especially where the molded laminate will be subjected to washing, to use a crosslinkable vinyl acetate/ethylene copolymer. While, for present purposes, the vinyl acetate/ethylene copolymer can be crosslinked by a variety of methods, two crosslinkable systems have found particular use. However, aside from the fact that the systems are crosslinkable, the points discussed above with respect to vinyl acetate/ethylene copolymers, i.e., use of surfactants, thickeners, molecular weights, etc., are generally applicable to the crosslinkable systems as well.

As discussed in U.S. Pat. 2,510,257 issued June 6, 1950, to Robinson, the films cast from polyvinyl acetate emulsions containing polyvinyl alcohol and glyoxal are quite water insensitive. Similarly, it has been discovered that vinyl acetate/ethylene copolymers behave in much the same way. Accordingly, vinyl acetate/ethylene copolymer dispersions containing 2-5 weight percent of a water soluble polyvinyl alcohol and about 0.1 to 1 weight percent glyoxal, both percents being based on the total weight of the copolymer, can be used in the present invention to provide fabric-film laminates which are particularly resistant to water, i.e., crosslinked. Dialdehydes other than glyoxal can also be used to insolubilize the polyvinyl alcohol, e.g., glutaraldehyde.

A further method by which the vinyl acetate/ethylene copolymer adhesive of the present invention can be rendered water resistant is by incorporating into the copolymer a monomer which subsequently will undergo a crosslinking reaction. One such monomer is N-methylol acrylamide. It has been discovered that by including this monomer in the vinyl acetate/ethylene copolymer in an amount of about 0.5–10, and preferably 2–6, weight percent, based on the weight of the total polymer, a particularly desirable water insensitive adhesive composition can be obtained. In order to ensure that the vinyl acetate/ethylene/N-methylol acrylamide terpolymers will crosslink on post curing, the dispersion should be applied at a pH of about 2–3. Frequently, in order to attain this pH, it will be necessary to add a water soluble weak acid such as oxalic or citric to the dispersion. Suitable N-methylol acrylamide terpolymer dispersions can be prepared in accordance with the method disclosed in U.S. Pat. 3,345,318 issued Oct. 3, 1967, to Lindemann et al. However, preferably, these terpolymers are prepared by an aqueous polymerization method, under ethylene pressure, wherein both the vinyl acetate and the N-methylol acrylamide are fed continuously to the polymerization reactor during the course of the polymerization; the rate of addition being about the same as that at which polymerization is proceeding.

Any plastic film which is capable of being stretched and molded can be used in forming the laminate of the present invention. Most commonly used, especially for automotive upholstery, are polyvinyl chloride films. However, other films such as those of polyvinylidene chloride, polyethylene, polystyrene, polypropylene, cellulose esters, acrylonitrile-butadiene-styrene copolymers, as well as vinyl chloride/vinyl acetate copolymers are also useful. While the thickness of the film is not particularly critical, film thicknesses of about 7 to 50 mils are ordinarily employed.

As mentioned in the section titled "Background of The Invention," several United States patents describe useful stretchable fabrics which can be employed in preparing the present laminate. In general, such fabrics are knitted, e.g., jersey, and can be prepared from a variety of synthetic thermoplastic yarns. Among others, such yarns include nylon, polyesters, copolyesters, polyvinyl derivatives, polyacrylonitriles, polyolefins, cellulose acetate, and blends of these. Ordinarily, nylon or polyester yarns are preferred.

In addition to the fabrics described previously, there have been developed several additional multidirectional stretchable fabrics which are particularly useful in the present invention. As described in abandoned U.S. patent application Ser. No. 513,943 filed Dec. 15, 1965, in the name of Epstein (Netherlands equivalent 67,02266), a particularly useful fabric is that formed from a thermoplastic yarn having a crimp elongation of about 15 percent to about 250 percent. When the crimp elongation is greater than 250% retraction occurs in the vacuum-formed product so that it is unacceptable. When crimp elongation is less than 15%, the fabric is insufficiently stretchable.

A crimped yarn is a yarn from a thermoplastic fiber, usually in the form of continuous filament, which is capable of a pronounced degree of stretch and rapid recovery. This property is conferred on yarn that has been subjected to an appropriate combination of deforming, heat setting and developing treatments.

Crimp elongation (CE) is defined as the percent increase in length obtained in crimped yarn when the yarn is extended to remove the crimp without further drawing the yarn filaments and is determined by the following formula:

$$CE = \frac{L_E - L_C}{L_C} \times 100$$

where: $L_C$=crimped yarn sample length and $L_E$=extended sample length under 0.10 gram/denier load for 30 seconds. Crimp development in monocomponent yarn samples is obtained by boiling the sample in water for 30 minutes under a load of 0.5 milligram per denier, while crimp development in multicomponent yarn samples is obtained by steaming the yarn sample at 240° F. for 15 seconds under a load of 0.5 milligram per denier.

The crimp in the yarn may be developed by such methods as (1) passing the yarn over an edge, (2) passing the yarn through a stuffer box, (3) twisting, heat-setting and detwisting, or (4) false-twisting and heat-setting simultaneously. When using the combination of heat-setting and twisting, the yarns are usually plied to control the elasticity of the final product. Jet texturing technology may also be applied to obtain the yarns of this invention. The nature of the yarn deformation is not critical. Preferably the crimped yarns are continuous filament monocomponent or multicomponent. Polyamides and copolyamides are particularly suitable as yarn forming materials. Mixtures of fibers are also useful for yarns of this invention.

A further type of useful fabric having multidirectional stretch characteristics is a relaxed-finished fabric weft knit in alternate courses of S twist synthetic staple yarn and Z twist synthetic staple yarn, the yarn having an elongation of not more than about 40 percent. While alternate S and Z course knitting has been known to give stretch to a fabric in one direction, it has also resulted in concurrent contraction in the other direction. However, by a unique relaxed finishing operation for the alternate course knitted fabric, it has been discovered that multidirectional stretch with dimensional stability can be imparted to the fabric.

The unique finishing operation involves two steps. Initially, the knitted alternate course fabric is hot tumbled in a dry state for about 20–60 minutes in a tumble dryer at a temperature corresponding to the relaxation temperature of the particular synthetic fiber making up the fabric. Ordinarily, this temperature is between about 160–220° F. After hot tumbling, the fabric is subjected to a relaxed scouring wherein the knitted fabric is further relaxed and cleaned to remove oil and greases. To accomplish this latter operation, the fabric is paddle tumbled in an ordinary detergent cleaning solution at a temperature below that at which the fabric would lose its intrinsic elongation. For polyester or acrylonitrile fibers this temperature is about 200° F., while for nylon fibers it is about 150° F. After this scouring operation, the fabric is dried and is then ready for use in the present invention.

Aside from the above finishing operation, in order to ensure multidirectional stretch, the tension of the yarn during knitting, the yarn speed, and the yarn twist level, is important. Accordingly, a yarn tension of between 4 and 5 grams has been found to be useful while the yarn speed should be at least 300 feet per minute. The operative twist level of the yarn is within the range of about a 2.0 to 4.0 twist multiplier.

Fabric-film laminates using the present adhesive can be formed at temperatures of about 275–350° F. with pressures of 30–70 p.s.i. Setting times at these temperatures and pressures are about 20 seconds to 2.5 minutes. After the fabric film laminate is formed according to the present invention, it is vacuum molded according to techniques well-known in the art. Reference is made to U.S. Pat. 3,249,984 issued May 10, 1966, to Storti for a description of a suitable method of vacuum molding. In general, molding is accomplished by preheating the laminate structure to about 300° F., where the film, fabric, and adhesive are soft, and thereafter applying a vacuum to the laminate in contact with a mold for about 30 seconds. Useful vacuums are about 25 to 29 inches of mercury.

Fabric-film laminates of this invention are not only useful as automotive or other types of upholstery material, but are also useful in forming other molded articles such as boots, ladies' handbags, raincoats, and tents, as well as many other articles having intricate complex configurations.

This invention is illustrated by the following examples wherein percentages and parts are in terms of weight unless otherwise stated.

Example I

Two-ply 70-denier, 34-filament crimped nylon yarn (spun from polyhexamethylene adipamide) having a crimp elongation of 171% is knit into plain jersey fabric. The fabric is hot tumbled, dry, at 200° F. for 60 minutes, and then relaxed, scoured at 140° F. for 45 minutes. After drying this relaxed finished fabric weighed 4.3 oz./yd.[2]. The fabric is then bonded for 2 minutes, using the respective adhesives indicated in Table 1 below, to 28-mil thick polyvinyl chloride film by laminating in a press for 2 minutes at 325° F. and 50 p.s.i. The laminate is next heated to 300° F. and immediately vacuum formed in a female berry box mold with a vacuum of about 28 inches of mercury. The vacuum is held on the sample until it has cooled close to room temperature and is removed from the mold. The formed products have a base area equal to about 99% of the mold base and describe 98% of the mold volume as measured by filling the formed products with water. The fabric (despite the high crimp elongation of the yarn) did not swell, or develop any wrinkles or other distortions during laminating, preheating, vacuum forming and post cooling.

Similar results are achieved when using a fabric plain jersey knit in alternate courses of S twist yarn and Z twist yarn. The yarns are spun 19 turns per inch, 26/1 cotton count, with 1.5 denier per filament 1½" cut staple fibers. The fibers are polyester spun from polyethylene terephthalate. The fabric is finished as in the above example except that the scouring temperature is 200° F.

The following table, Table 1, describes three adhesive compositions which were used in preparing laminates according to the procedure outlined above in Example I. The adhesive was applied in an amount of about 0.5 oz. of emulsion per square yard of film. The subsequent table, Table 2, sets forth the tongue tear strength and peel adhesion of the Example I laminates and of the vacuum-formed structures. Tongue tear strength is measured with an Instron Machine following the procedure of ASTM D–39. Peel adhesion strength is measured with the same machine. About ½" of the laminate is delaminated manually and then the film is placed in one clamp and the fabric in the other clamp. Peel adhesion is the average load used to continue the delamination in the machine. The laminate tear and peel strengths with laminates of the prior art rarely exceed, without special processing techniques, 5 lbs. and 5 lbs./in., respectively, for both wale and course direction.

TABLE 1

| Adhesive | Application form | Copolymer | Surfactant | Glyoxal |
| --- | --- | --- | --- | --- |
| A | Aqueous emulsion (55% solids, 4.5% polyvinyl alcohol based on solids, 4 grams 4% methocel solution per 100 grams emulsion). | Vinyl acetate/ethylene (13.5 wt. percent ethylene). | 1 gram 75% "Aerosol" OT sol. per 100 grams emulsion. | None. |
| B | do | do | do | 2 grams 40% glyoxal sol. per 100 grams emulsion. |
| C | Aqueous emulsion (48% solids, 2 grams 4% methocel solution, 1 gram 10% oxalic acid solution per 100 grams emulsion). | Vinyl acetate/ethylene/ N-methylol acrylamide (13.2 wt. percent ethylene, 4.0 wt. percent N-methylol acrylamide). | (2.4 grams 75% "Aerosol" OT sol., 1.6 grams "Aerosol" MA (80%), 2.2 grams "Triton" X-100) per 100 grams emulsion. | None. |

TABLE 2

| Laminating time in press, mins. | Laminate | | | | Vacuum formed structure, Peel (lb./in.) | |
|---|---|---|---|---|---|---|
| | Tear (lb.) | | Peel (lb./in.) | | | |
| | Wale | Course | Wale | Course | Wale | Course |
| Adhesive: | | | | | | |
| A | 2 | 17 | 24 | 16 | 11 | 15 | 8 |
| B | 2 | 19 | 23 | 15 | 11 | 16 | 9 |
| C | 2 | 20 | 25 | 18 | 11 | 18 | 13 |

We claim:

1. A thermoformable laminate comprising a stretchable thermoplastic fabric of thermoplastic staple yarn knit in alterate courses of S and Z twist yarns, the yarns having an elongation at break of not more than about 40 percent bonded to a plastic film with an adhesive essentially comprising a vinyl acetate/ethylene copolymer containing about 5–40 weight percent copolymerized ethylene.

2. The laminate of claim 1 wherein the fabric is a knit fabric of nylon or polyester yarns, the plastic film is polyvinyl chloride, polyvinylidene chloride, or a vinyl chloride/vinyl acetate copolymer, and the copolymer adhesive contains about 5–25 weight percent copolymerized ethylene.

3. The laminate of claim 2 wherein the vinyl acetate/ethylene copolymer is crosslinked.

4. The laminate of claim 3 wherein the vinyl acetate/ethylene copolymer is a terpolymer of vinyl acetate, ethylene, and N-methylol acrylamide containing 10–20 weight percent copolymerized ethylene and 2–6 weight percent copolymerized N-methylol acrylamide.

5. The laminate of claim 1 wherein the adhesive is applied in the form of an aqueous emulsion essentially comprising the copolymer and at least 0.05 weight percent, based on the copolymer, of surfactant.

6. The laminate of claim 2 wherein the adhesive is applied in the form of an aqueous emulsion essentially comprising the copolymer and at least 0.05 weight percent, based on coploymer, of surfactant.

7. The laminate of claim 6 wherein the vinyl acetate/ethylene copolymer is a binary coplymer containing 10–20 weight percent copolymerized ethylene.

8. The laminate of claim 6 wherein the aqueous emulsion contains a polyvinyl alcohol and glyoxal in amounts sufficient to render the vinyl acetate/ethylene copolymer crosslinkable.

9. The laminate of claim 6 wherein the vinyl acetate/ethylene copolymer is a terpolymer of vinyl acetate, ethylene, and N-methylol acrylamide containing 10–20 weight percent copolymerized ethylene and 2–6 weight percent copolymerized N-methylol acrylamide.

10. The laminate of claim 1 wherein the knit fabric prior to lamination is relaxed-finished by (1) tumbling the fabric at a temperature corresponding to the relaxation temperature of the particular fiber making up the fabric, (2) tumbling the fabric in a cleaning solution at a temperature below that at which the fabric loses its intrinsic elongation, and then (3) drying the fabric.

11. The laminate of claim 2 wherein the knit fabric prior to lamination is relaxed-finished by (1) tumbling the fabric at a temperature corresponding to the relaxation temperature of either the nylon or polyester yarns making up the fabric, (2) tumbling the fabric in a cleaning solution at a temperature below that at which the fabric loses its intrinsic elongation, and then (3) drying the fabric.

References Cited
UNITED STATES PATENTS

| 3,440,133 | 4/1969 | Burnett | 161—91X |
| 3,400,004 | 9/1968 | Corry | 161—9X |
| 3,380,851 | 4/1968 | Lindemann et al. | 260—29.6X |
| 3,355,322 | 11/1967 | Worrall et al. | 117—126 |
| 3,345,318 | 10/1967 | Lindemann et al. | 260—296 |
| 3,337,482 | 8/1967 | Watanabe et al. | 260—8 |
| 2,631,958 | 3/1953 | Francis | 161—94X |
| 2,510,257 | 6/1950 | Robinson | 260—29.6 |
| 2,332,373 | 10/1943 | Dorough et al. | 117—98X |

FOREIGN PATENTS

| 582,093 | 9/1946 | Great Britain | 260—897 |

ROBERT F. BURNETT, Primary Examiner

M. A. LITMAN, Assistant Examiner

U.S. Cl. X.R.

161—89, 92; 156—221